US012392168B2

(12) United States Patent
Chong et al.

(10) Patent No.: US 12,392,168 B2
(45) **Date of Patent: *Aug. 19, 2025**

(54) UNIVERSAL CHASSIS FOR DOOR HANDLE ASSEMBLIES

(71) Applicant: ASSA ABLOY Americas Residential Inc., New Haven, CT (US)

(72) Inventors: Gerald Chong, Mission Viejo, CA (US); Jeanette V. Bui, Lake Forest, CA (US); Michael Winardi, Chino Hills, CA (US); Lynthia Li Yan, Xiamen (CN)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,339

(22) Filed: Nov. 8, 2023

(65) Prior Publication Data

US 2024/0141696 A1 May 2, 2024

Related U.S. Application Data

(63) Continuation of application No. 17/569,877, filed on Jan. 6, 2022, now Pat. No. 11,851,912.

(Continued)

(51) Int. Cl.
*E05B 63/00* (2006.01)
*E05B 3/04* (2006.01)

(Continued)

(52) U.S. Cl.
CPC ............ *E05B 63/0056* (2013.01); *E05B 3/04* (2013.01); *E05B 3/06* (2013.01); *E05B 15/02* (2013.01)

(58) Field of Classification Search
CPC ... E05B 3/00; E05B 3/003; E05B 3/02; E05B 3/04; E05B 3/06; E05B 3/065;

(Continued)

(56) References Cited

U.S. PATENT DOCUMENTS 3,023,602 A * 3/1962 Foote ...................... E05B 37/00 70/332
4,333,324 A * 6/1982 Dietrich ................ E05B 55/005 292/172

(Continued)

FOREIGN PATENT DOCUMENTS

CA 2454818 7/2004
CA 2454818 A1 * 7/2004 ............... E05B 9/08

(Continued)

OTHER PUBLICATIONS

PCT International Search Report and Written Opinion in Application PCT/US2022/011464, mailed Apr. 25, 2022, 11 pages.

(Continued)

*Primary Examiner* — Nathan Cumar
(74) *Attorney, Agent, or Firm* — Merchant & Gould P.C.

(57) ABSTRACT

A door handle assembly includes a chassis, first and second trim plates, and a latch assembly. The chassis includes an interior chassis portion and an exterior chassis portion. The interior chassis portion is configured to extend from a first side of a door and includes at least one trim engagement mechanism. The exterior chassis portion is configured to extend from a second side of a door and includes at least one trim engagement mechanism. The first trim plate is configured to removably engage the first trim engagement mechanism, optionally via a trim plate adapter. The second trim plate is configured to removably engage the second trim engagement mechanism, also optionally via a trim plate adapter. The latch assembly extends between the exterior chassis portion and the interior chassis portion. The first trim (Continued)

engagement mechanism and the second trim engagement mechanism are capable of removably engaging with interchangeable trim plates.

20 Claims, 11 Drawing Sheets

Related U.S. Application Data

(60) Provisional application No. 63/134,821, filed on Jan. 7, 2021.

(51) Int. Cl.
*E05B 3/06* (2006.01)
*E05B 15/02* (2006.01)

(58) Field of Classification Search
CPC ........ E05B 15/00; E05B 15/02; E05B 15/025; E05B 15/0205; E05B 15/021; E05B 15/022; E05B 15/0225; E05B 2015/0215; E05B 63/00; E05B 63/0056; E05B 63/006
USPC .......................................................... 292/357
See application file for complete search history.

(56) References Cited

U.S. PATENT DOCUMENTS

| | | | | |
|---|---|---|---|---|
| 4,569,547 | A * | 2/1986 | Fayerman | E05B 3/065 292/DIG. 60 |
| 5,934,716 | A * | 8/1999 | Koveal | E05C 1/10 292/DIG. 61 |
| 6,619,710 | B1 * | 9/2003 | Hwang | E05B 63/006 292/336.3 |
| 8,960,740 | B2 | 2/2015 | Huang et al. | |
| 11,851,912 | B2 | 12/2023 | Chong | |
| 2013/0276491 | A1 * | 10/2013 | Huang | E05B 9/002 70/448 |
| 2017/0275915 | A1 * | 9/2017 | Murphy | E05B 55/005 |

FOREIGN PATENT DOCUMENTS

| | | | |
|---|---|---|---|
| CN | 202039660 | U | 11/2011 |
| TW | M393556 | U | 12/2010 |
| TW | 202035841 | A | 10/2020 |

OTHER PUBLICATIONS

PCT International Preliminary Report on Patentability in Application PCT/US2022/011464, mailed Jul. 20, 2023, 8 pages.

* cited by examiner

UNIVERSAL CHASSIS FOR DOOR HANDLE ASSEMBLIES

CROSS-REFERENCE TO RELATED APPLICATIONS

This application is a continuation of U.S. patent application Ser. No. 17/569,877, filed Jan. 6, 2022, now U.S. Pat. No. 11,851,912, which claims the benefit of U.S. Provisional Application No. 63/134,821, filed Jan. 7, 2021, the entire disclosures of which are herein incorporated by reference in their entireties. To the extent appropriate, a claim of priority is made to each of the above disclosed applications.

TECHNICAL FIELD

The present disclosure relates to the field of door handle assemblies. In particular, this disclosure relates to a device and method of providing a universal chassis that can accommodate a variety of escutcheons.

BACKGROUND

Door handle assemblies are commonly known in the art and are used for installation on different types of doors. The door handle assembly is generally comprised of a rotatable handle having a locking mechanism, a handle mount, and a faceplate. Door handle assemblies may be used for installation on either newly manufactured doors or currently installed doors, which require replacement of an existing door handle assembly. Further, replacing an existing door handle assembly may not require replacing the entire door handle assembly, but instead the internal chassis or an entire interior and/or exterior assembly.

The door handle assemblies currently available include internal chassis pieces and faceplates that are manufactured to fit together. Accordingly, although portions of a door handle assembly may be replaced, typically such replacements are “like for like” because a chassis is typically designed for use with the same faceplate type with which that chassis was originally sold. Accordingly, if a user wishes to change the type of faceplate used in the door handle assembly, typically the entire assembly must be replaced.

SUMMARY

In general terms, this disclosure is directed toward a device and method for providing a universal chassis that can accommodate a variety of escutcheons.

In a first aspect, a door handle assembly includes a chassis, a first and second escutcheon, and a latch assembly. The chassis includes an interior chassis portion and an exterior chassis portion. The interior chassis portion is configured to extend from a first side of a door and includes at least one trim plate having at least one first fastener engagement mechanism. The exterior chassis portion is configured to extend from a second side of a door and includes at least a second trim plate having at least one second fastener engagement mechanism. The first escutcheon has at least one first post configured to removably engage the at least one first fastener engagement mechanism. The second escutcheon has at least one second post configured to removably engage the at least one second fastener engagement mechanism. The latch assembly extends between the exterior chassis portion and the interior chassis portion. The at least one first fastener engagement mechanism and the at least one second fastener engagement mechanism are capable of removably engaging with a plurality of different escutcheons.

In another aspect, a method of installing a door handle assembly is described. The method includes positioning a latch assembly at least partially within a crossbore of a door. An interior escutcheon is attached to a first trim plate of an interior chassis portion and an exterior escutcheon is attached to a second trim plate of an exterior chassis portion. The interior chassis is positioned at a borehole on an interior side of the door, and the interior chassis comprises an interior handle mount attachable to an interior handle. A first mounting post and a second mounting post extend toward and are engageable with an exterior chassis. The exterior chassis portion is positioned at the borehole on an exterior side of the door. The exterior chassis comprises an exterior handle mount attachable to an exterior handle. An exterior latch mount is rotatably attached to the latch assembly and the interior chassis portion. The interior handle is attached to the interior handle mount and the exterior handle is attached to the exterior handle mount. At least one mounting screw is inserted and tightened into a corresponding mounting post that extends from the interior escutcheon through the interior chassis portion and to the exterior chassis portion. The interior escutcheon and the exterior escutcheon are removable from the interior chassis portion and the exterior chassis portion.

In yet another aspect, a door handle assembly is described. The door handle assembly includes a chassis, an interior escutcheon, an exterior escutcheon, and a latch assembly. The chassis comprises an interior chassis portion and an exterior chassis portion. The interior chassis portion is configured to extend from a first side of a door and comprises at least one first recess and at least one first catch. The exterior chassis portion is configured to extend from a second side of a door and comprises at least one second recess and at least one second catch. The interior escutcheon comprises at least one first post and at least one first cantilever and the exterior escutcheon comprises at least one second post and at least one second cantilever. The latch assembly extends between the exterior chassis portion and the interior chassis portion. The at least one first recess is configured to removably engage with the at least one first post and the at least one first catch is configured to removably engage with the at least one first cantilever. The at least one second recess is configured to removably engage with the at least one second post and the at least one second catch is configured to removably engage with the at least one second cantilever.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
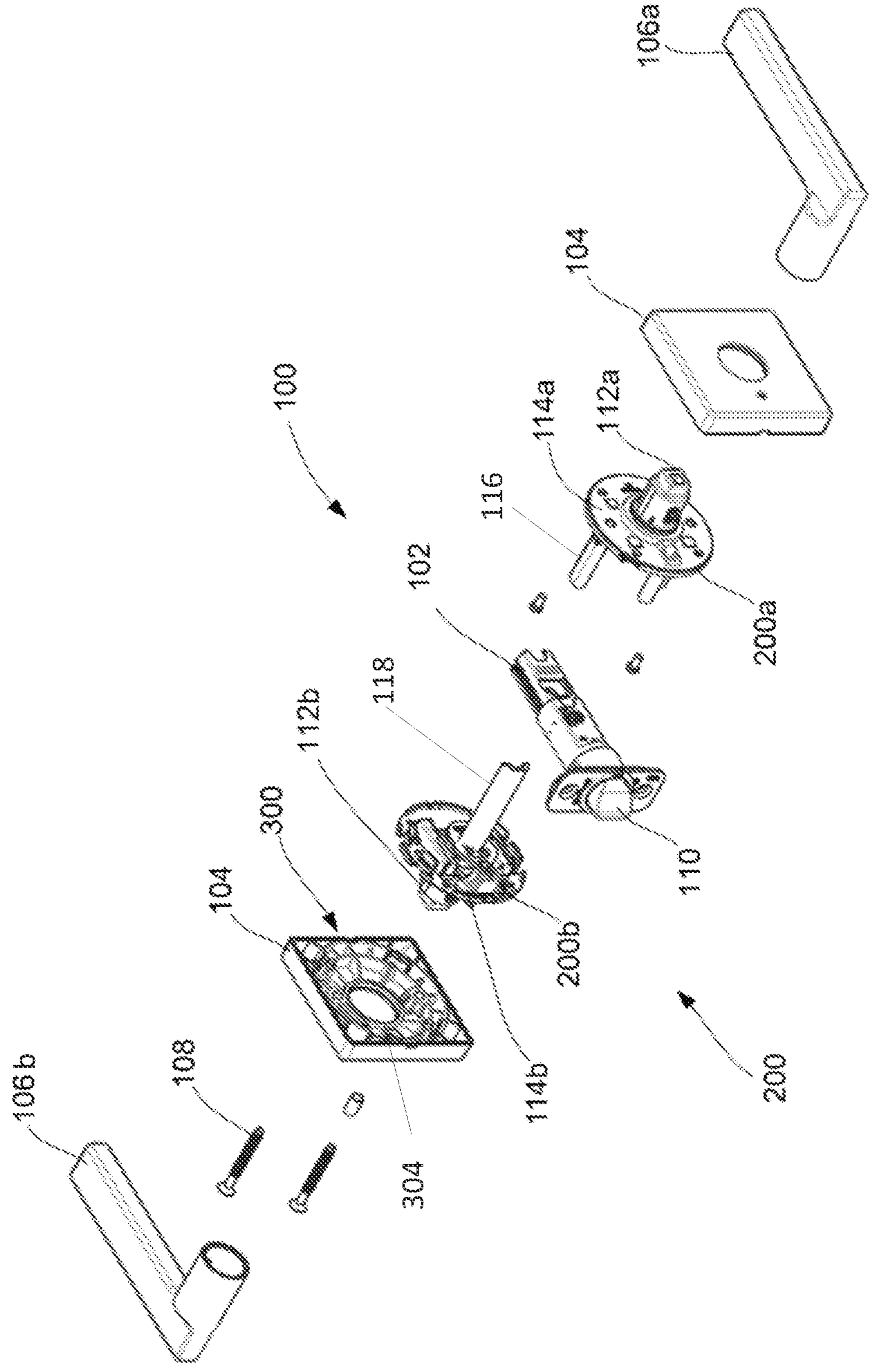
FIG. 1 illustrates an exploded embodiment of a door handle assembly according to an example embodiment.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In example aspects of the present disclosure, a door handle assembly includes a universal chassis that allows for the installation of any escutcheon, including escutcheons having different aesthetic appearances. Such an assembly eliminates the requirement that a chassis is only able to accommodate a single escutcheon. Further, the escutcheons may be removably attached to a trim plate of the chassis, allowing for the escutcheon to be changed without having to also change the chassis.

The chassis and escutcheon and/or trim plate adapter may include a plurality features that create a secure attachment that prevents movement in any direction. For example, and as described below, an example embodiment includes two offsetting posts and two offsetting screw attachments that correctly align the escutcheon (for example, squarely) to the universal chassis and prevents subsequent movement between the escutcheon and/or trim plate adapter and the universal chassis. In alternative embodiments, other alignment features, such as use of posts, attachment tabs, and crush ribs may be used.

FIG. 1 illustrates an exploded view of an example embodiment of a door handle assembly 100 according to example embodiments described herein. The door handle assembly 100 includes at least a latch assembly 102 and a universal chassis 200. The universal chassis 200 includes a first chassis portion 200*a* and a second chassis portion 200*b*. The first chassis portion 200*a* is configured to extend from a first side of a door and the second chassis portion 200*b* is configured to extend from a second, opposing side of a door.

The first chassis portion 200*a* and the second chassis portion 200*b* are configured to engage the latch assembly 102 and each other to actuate a latch bolt 110. As described in more detail below, the chassis 200 is a universal chassis and is configured to engage with a plurality of different types of escutcheons 104, with or without a trim plate adapter. The first chassis portion 200*a* has a trim plate 114*a* configured to be located on an outside of a first side of a door, and the second chassis portion 200*b* has a trim plate 114*b* configured to be located on an outside of a second side of the door. The trim plates 114*a*, 114*b* are capable of removably connecting to a plurality of escutcheons 104. The universal chassis 200 allows a user to change the escutcheon 104 (without or without a trim plate adapter 300) without having to also change the chassis 200.

The door handle assembly 100 includes two escutcheons 104, one located on each exterior side of the interior chassis portion 200*a* and the exterior chassis portion 200*b*. As described in further detail below, an escutcheon 104 may be a stamped rose or a cast rose. A stamped rose may also include a trim plate adapter 300 configured to engage the stamped rose and the trim plates 114*a*, 114*b* of the chassis 200.

A handle 106*a* is engageable with an interior handle mount 112*a*, and a handle 106*b* is engageable with an exterior handle mount 112*b*. The escutcheons 104 include a handle opening 304, allowing the handles 106*a*, 106*b* to extend through the escutcheon 104 to the chassis 200.

At least one mounting screw 108 is insertable through and engageable with the escutcheon 104, the exterior chassis portion 200*b*, and the interior chassis portion 200*a*. In the example shown, a pair of such mounting screws 108 are used. The interior chassis portion 200*a* includes a pair of mounting posts 116 that extend toward and are engageable with the exterior chassis portion 200*b*. The exterior chassis portion 200*b* includes an exterior latch mount 118 that rotatably attaches to the latch assembly 102 and the interior chassis portion 200*a*.

Figure 2:
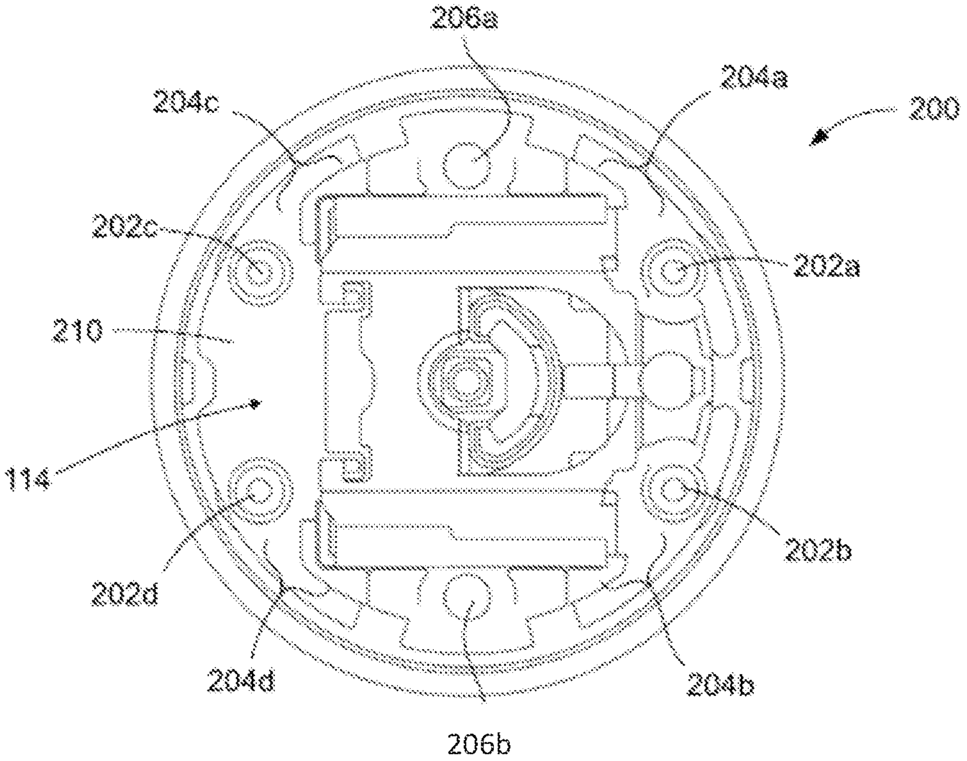
FIG. 2 illustrates an interior view of a universal chassis.

FIG. 2 illustrates an example outside facing view of a trim plate 114 of an interior chassis portion 200*a* or an exterior chassis portion 200*b*. In the orientation shown, the trim plate 114 faces away from the door and engages with the escutcheon 104. Each of the interior chassis portion 200*a* and the exterior chassis portion 200*b* has generally the same outside facing coupling features on a base 210 that are used to engage with an outer body that is an escutcheon 104 and/or trim plate adapter 300. The interior chassis portion 200*a* is shown as an exemplary embodiment of the trim plate 114 having the outside facing coupling features on the base 210. The trim plate 114 includes the outside facing coupling features including at least one fastener attachment 202 (also known as a fastener engagement mechanism), at least one catch 204, a first fastener hole 206*a*, and a second fastener hole 206*b*. The first fastener hole 206*a* and the second fastener hole 206*b* are configured to allow a mounting screw 108 to engage the exterior chassis portion 200*b* and the interior chassis portion 200*a*.

As shown in the example embodiment, four fastener attachments 202*a*, 202*b*, 202*c*, 202*d* are included on the trim plate 114. Also included are four catches 204*a*, 204*b*, 204*c*, 204*d*. However, fewer fastener attachments 202 and/or fewer catches 204 may be implemented on the trim plate 114, for example two fastener attachments 202*a*, 202*d* and two catches 204*c*, 204*b*.

In an example embodiment, the fastener attachment 202 is a recess or aperture through the trim plate 114 that is configured to receive a post from a trim plate adapter 300 or an escutcheon 104. The recess is sized and shaped to securely and snugly fit the post, which is described below. For example, the fastener attachment 202 is in the form of a recess that includes an interference fit to securely attach the escutcheon 104 to the trim plate 114. In another embodiment, the fastener attachment 202 is an opening configured to allow a post of the escutcheon 104 or trim plate adapter 300 to extend through.

Figure 8A:
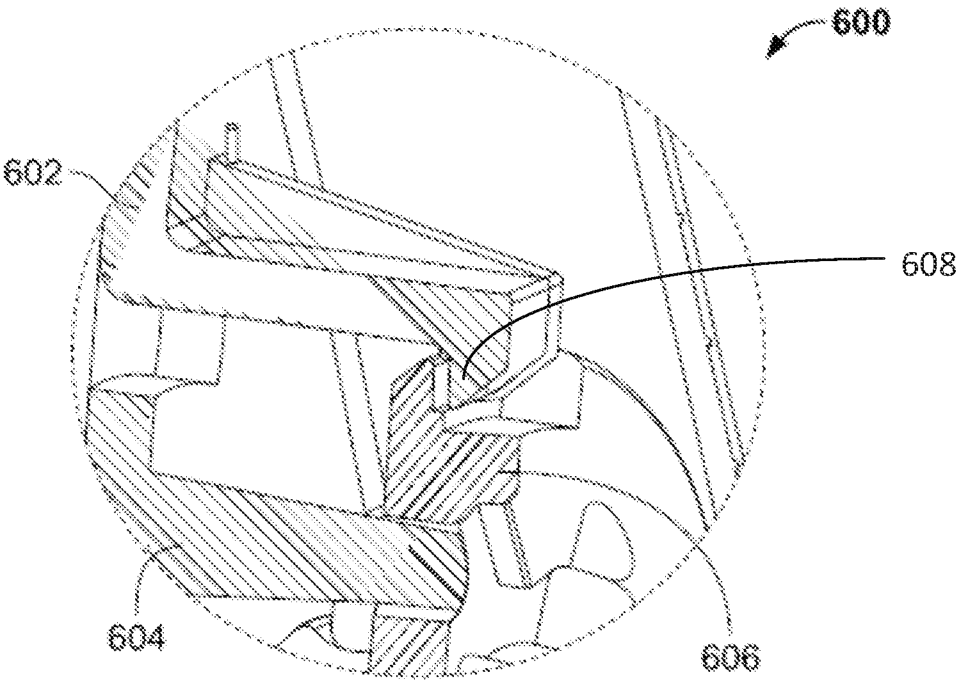
FIGS. 8*a*-8*c* illustrate different embodiments of a snap fit joint between a trim plate and an escutcheon.
Figure 8B:
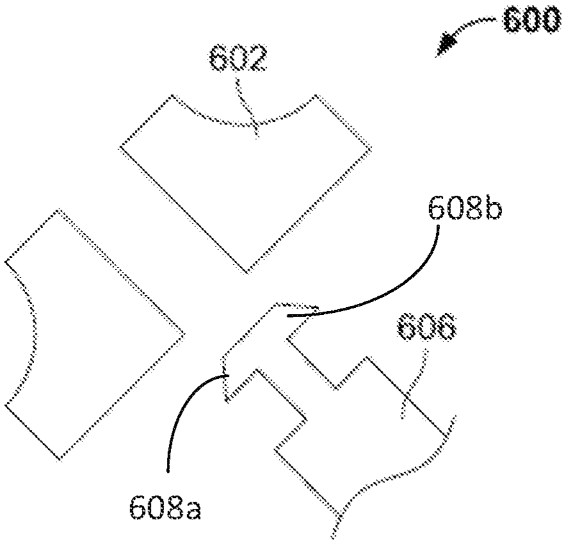
Figure 8C:
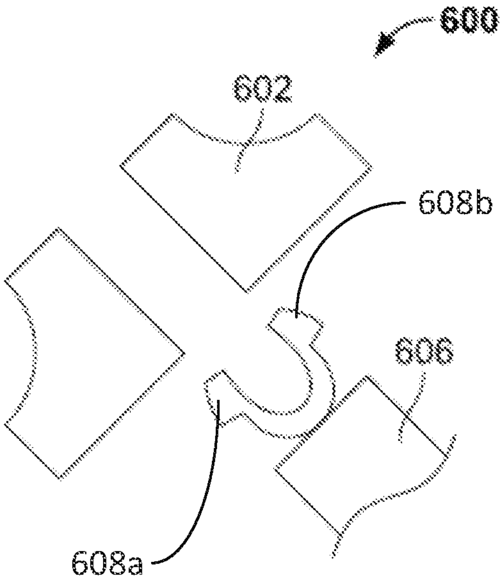

The at least one catch 204 includes a cantilever feature, which is described in more detail at FIGS. 8*a*-8*c*. The at least one catch 204 engages with the trim plate adapter 300, or in some embodiments, with the escutcheon 104.

Figure 3:
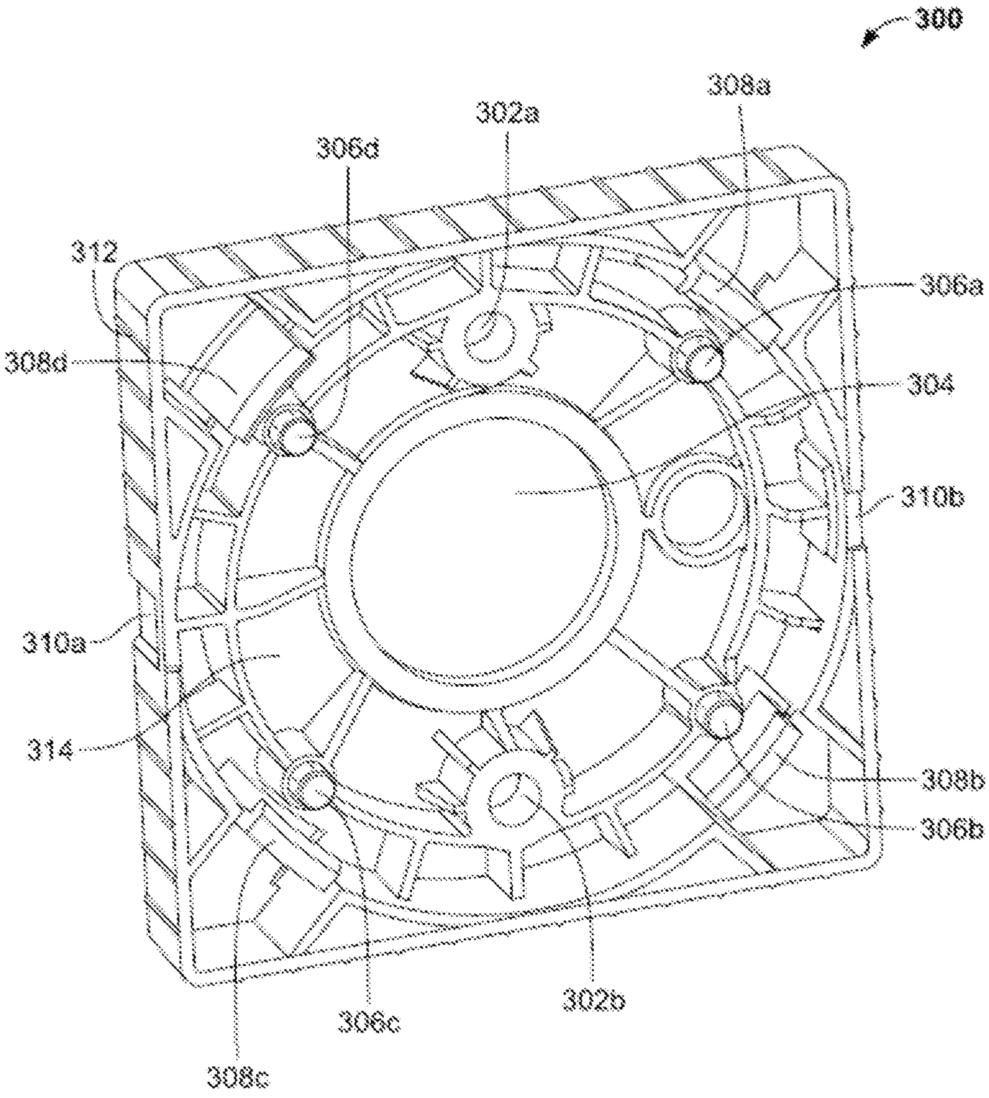
FIG. 3 illustrates an example embodiment of a trim plate adapter.

FIG. 3 illustrates an example embodiment of a trim plate adapter 300. A trim plate adapter 300 is configured to engage with both the escutcheon 104 and the trim plate 114 of one of the chassis portions 200*a*, 200*b* to provide a secure fit. The trim plate adapter 300 is configured to allow any escutcheon 104 to engage with the universal chassis 200. Although the trim plate adapter 300 is shown as having a square shape, alternative shapes are possible, such as rectangular, oval, or circular. For example, the trim plate adapter 300 may be secured within a stamped escutcheon 104 to eliminate any relative movement between the stamped escutcheon 104 and the chassis 200. Further, the trim plate adapter 300 can be used to removably attach any escutcheon 104 to the universal chassis 200.

The trim plate adapter 300 includes interior facing coupling features including a first fastener hole 302*a* and a second fastener hole 302*b*, a handle opening 304, at least one post 306, and at least one snap fit joint 308.

The trim plate adapter 300 has an outer dimension configured to fit within an escutcheon 104. The trim plate adapter 300 includes first and second connection mechanisms 310*a*, 310*b* that allow the trim plate adapter 300 to securely engage the escutcheon 104. The trim plate adapter 300 may also include a plurality of ridges 312 along an outside edge that provide an interference or friction fit within the escutcheon 104. The plurality of ridges 312 extend in a longitudinal direction along a perimeter of the trim plate adapter 300. In an embodiment, the plurality of ridges 312 are sized to fit snugly within the escutcheon 104. In alternative examples, the ridges 312 can extend in any direction non-parallel to the perimeter of the escutcheon 104.

The trim plate adapter 300 includes at least one post 306 that extends in a direction toward the chassis 200. As shown in the example embodiment, the four posts 306*a*, 306*b*, 306*c*, 306*d* extend from a base 314 of the trim plate adapter 300. However, two or four posts may be utilized.

In an embodiment, the at least one post 306 includes a plurality of ridges 312 that form a frictional engagement between the trim plate adapter 300 and the trim plate 114 of the chassis 200. The ridges 312 extend in a perpendicular direction from the post 306. In an embodiment, the plurality of ridges 312 are sized to fit snugly within a recess of the chassis 200. In alternative examples, the ridges 312 can extend in any direction non-parallel to the perimeter of the post 306.

In yet another embodiment, the plurality of ridges 312 are located on the post 306, such that when extended through a fastener attachment 202 comprising an opening of the chassis 200, the ridges 312 maintain the post 306 through the opening.

In a further embodiment, the fastener attachment 202 of the chassis 200 and the post 306 of the trim plate adapter 300 are used to align the chassis 200 and the trim plate adapter 300. The snap fit joint 308 is used to securely attach the trim plate adapter 300 to the chassis 200.

As shown in the example embodiment, four snap fit joints 308*a*, 308*b*, 308*c*, 308*d* are included on the trim plate adapter 300. However, two or four snap fit joints 308 may be utilized. The snap fit joints 308 maintain the fit between the trim plate adapter 300 and the trim plate 114. The snap fit joints 308 are described in further detail at FIGS. 8*a*-8*c*.

The trim plate adapter 300 may be sized and shaped so the post 306 of the trim plate adapter 300 engages with the fastener attachment 202 of the chassis 200, and so the snap fit joint 308 engages with the catch 204. Further, the trim plate adapter 300 is sized and shaped so the fastener holes 302*a*, 302*b* of the trim plate adapter 300 align with the fastener holes 206*a*, 206*b* of the chassis 200. The trim plate adapter 300 may have an exterior shape sized to fit any size escutcheon 104, especially trim plates 114 that have a larger length and width than a traditional escutcheon 104.

It is noted that, in the absence of a trim plate adapter 300, an escutcheon may be constructed to have interior facing coupling features analogous to those of the trim plate adapter, to engage with the trim plate 114 analogously. However, in such arrangements, while escutcheons may be interchangeable among those which have such internal features, use of the trim plate adapter 300 allows a variety of other escutcheon types to be used by disassociating the exterior appearance of the escutcheon from the interior engagement mechanism connecting that escutcheon to the trim plate 114.

Figure 4:
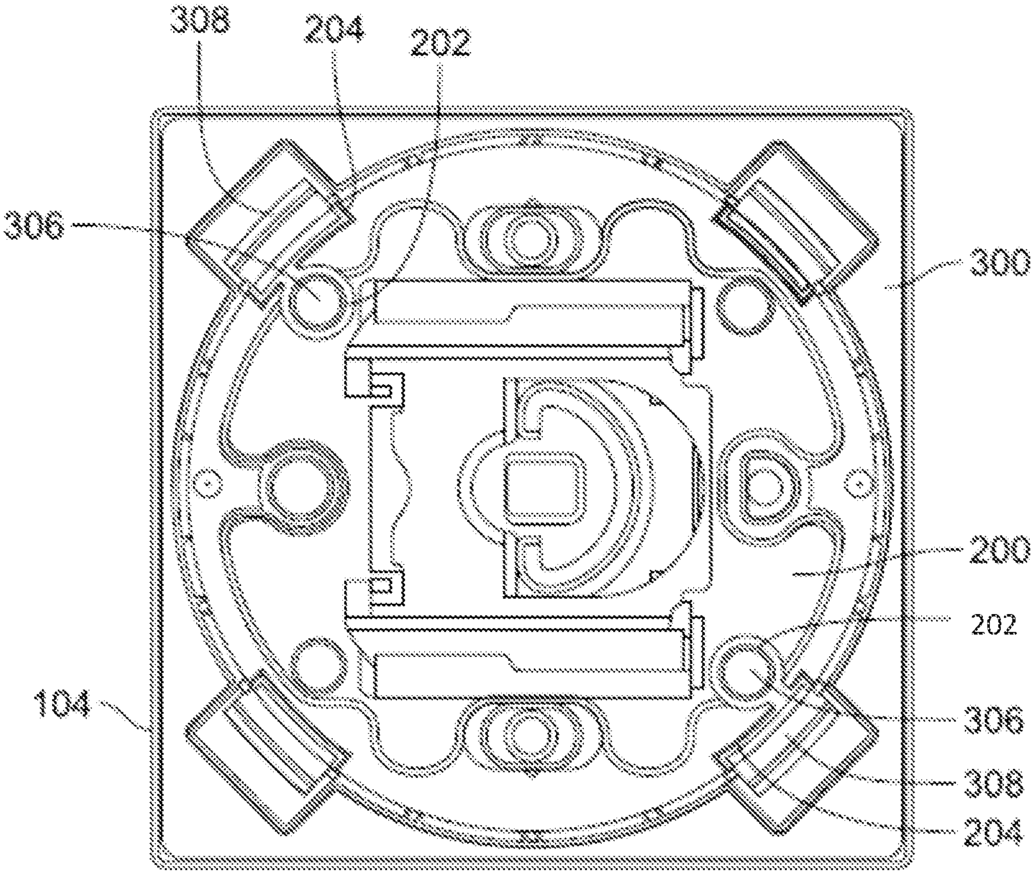
FIG. 4 illustrates an example embodiment of a chassis assembly including an escutcheon and trim plate adapter connected to a trim plate of a chassis.

FIG. 4 illustrates a chassis assembly including a trim plate adapter 300 connected to the escutcheon 104 and the trim plate 114 of the chassis 200. The trim plate adapter 300 is removably secured to the trim plate 114 with the at least one snap fit joint 308 connected to the at least one catch 204, and the at least one post 306 connected to the at least one fastener attachment 202.

In the example shown, each of the four posts 306*a*, 306*b*, 306*c*, 306*d* extend through each of the four fastener attachments 202*a* 202*b*, 202*c*, 202*d*. The fastener attachment 202 of the trim plate 114 includes recesses through which each of the posts 306 extends through. The posts 306 may include a plurality of ridges that create an interference fit to securely attach to the trim plate 114 without movement in any direction.

Figure 5:
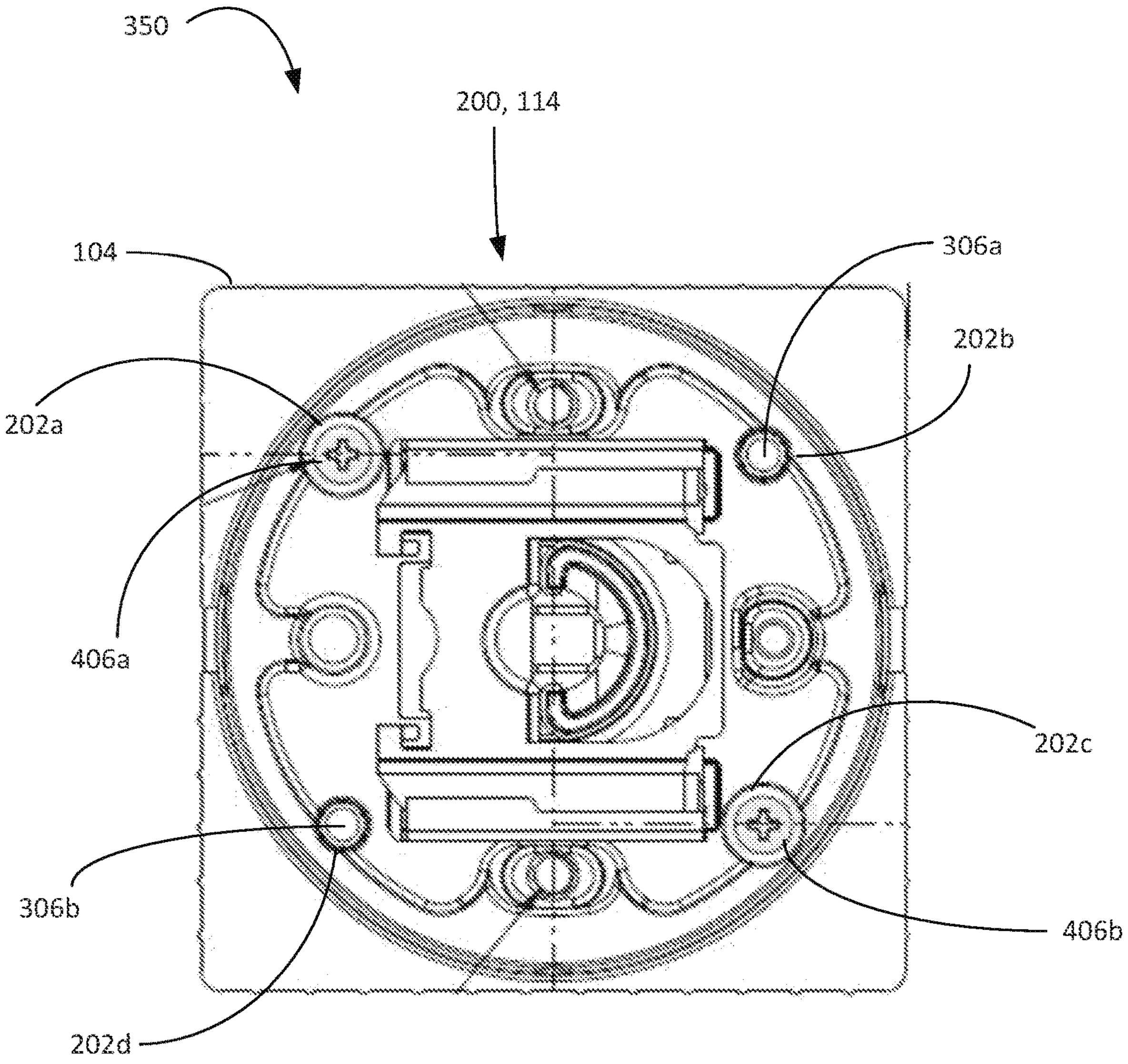
FIG. 5 illustrates another example embodiment of a trim plate adapter.

FIG. 5 illustrates another example embodiment of a trim plate adapter 350 connected to the escutcheon 104 and the trim plate 114 of the chassis 200. In the embodiment shown, the connection between the trim plate 114 and the trim plate adapter 350 is maintained by the post 306*a*, 306*b* extending through the fastener attachments 202*b*, 202*d*, and two fasteners 406*a*, 406*b* extending through the fastener attachments 202*a*, 202*c*.

The chassis 200 is secured to the trim plate adapter 350 with the at least one fastener 406 connected to the at least one fastener attachment 202. In the example shown, two fastener attachments 202*a*, 202*b* are recesses configured to accept first and second posts 306*a*, 306*b*. Two other fastener attachments 202*a*, 202*c* are configured to accept first and second fastener 406*a*, 406*b*. The fasteners 406*a*, 406*b* may be a screw, as shown.

Figure 6:
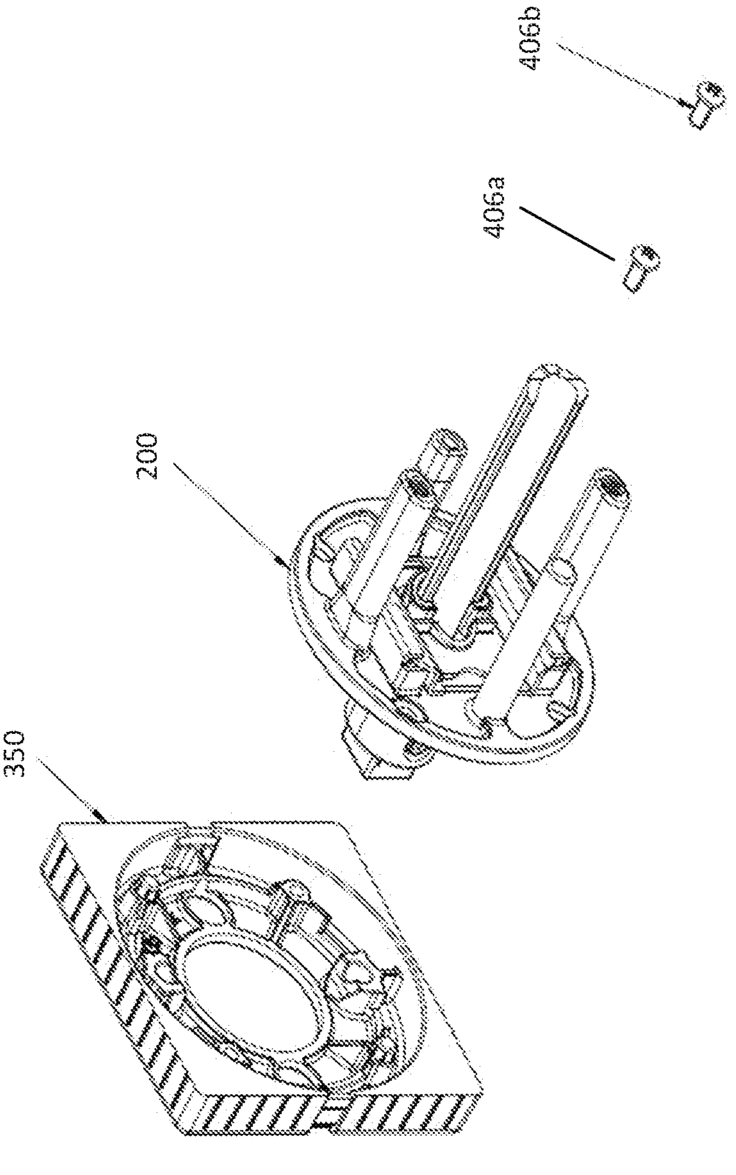
FIG. 6 illustrates an exploded view of a chassis assembly including a chassis and a trim plate adapter of FIG. 5.

FIG. 6 illustrates an exploded view of a chassis assembly including the trim plate adapter 350 and chassis 200 of FIG. 5. As shown, the first and second fastener 406*a*, 406*b* extend into the chassis 200 and then the trim plate adapter 350. The fasteners 406 are only capable of being accessed from an inside of the chassis 200 before being installed on a door.

Figure 7:
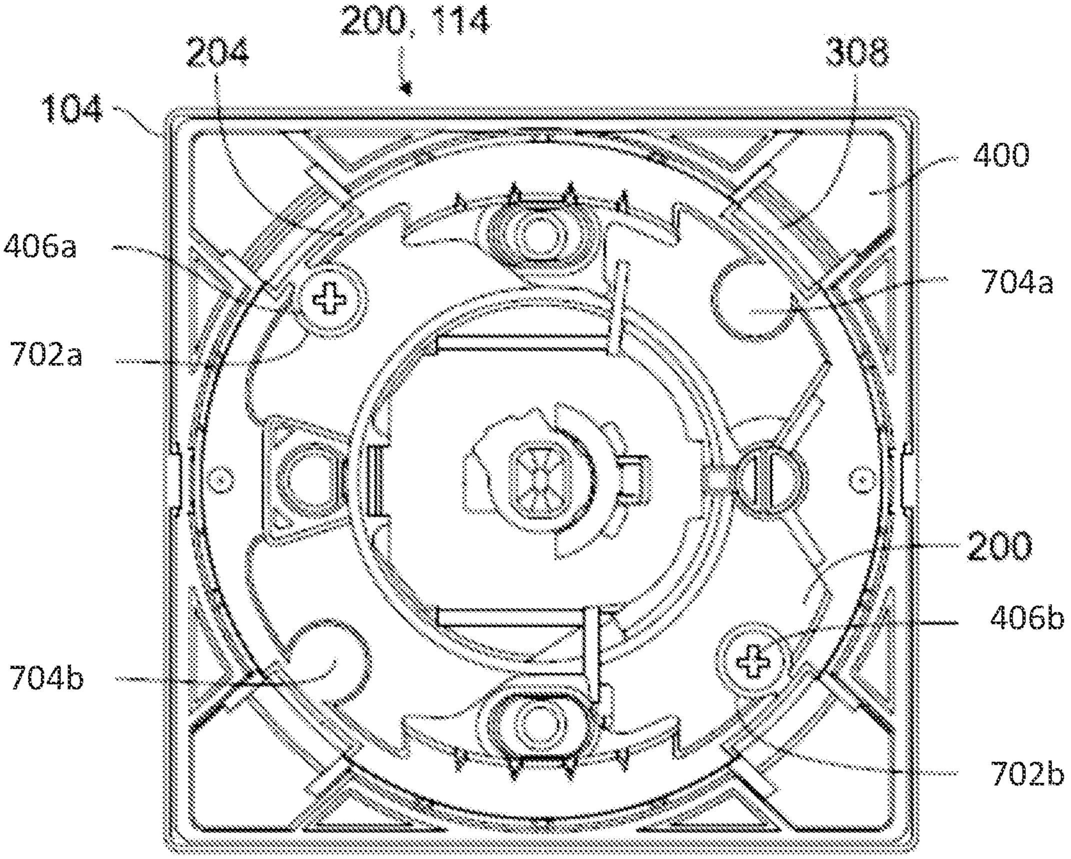
FIG. 7 is a plan view of the chassis assembly of FIG. 6 with the trim plate adapter mounted to the chassis.

FIG. 7 illustrates an assembled configuration of a chassis assembly in a further possible embodiment, in which a trim plate adapter 400 is connected to both the escutcheon 104 and the trim plate 114 of the chassis 200. In the embodiment shown, the connection between the trim plate 114 and the trim plate adapter 400 is maintained by the post 306 extending through the fastener attachment 202, and the snap fit joint 308 engaging with the catch 204. However, in this alternative embodiment, only one of the posts 306 and the fastener attachment 202, or the snap fit joint 308 and the catch 204, are needed to secure the escutcheon 104 to the trim plate 114.

The chassis 200 is secured to the trim plate adapter 400 with the at least one snap fit joint 308 connected to the at least one catch 204 and the at least one post (not shown) connected to the at least one fastener attachment 202*b*, 202*d*. The connection between the at least one snap fit joint 308 and the at least one catch 204 is shown in more detail at FIGS. 8*a*-8*c*.

In the example shown, two of the fastener attachments 702*a*, 702*b* are openings, and two of the fastener attachments 704*a*, 704*b* are recesses. The first and the second posts (not shown) extend through two of the fastener attachment 702*a*, 702*b*, and first and second fastener 406*b*, 406*b* extend into two of the fastener attachments 704*a*, 704*b*.

FIGS. 8*a*-8*c* illustrate different embodiments of a snap fit joint 600 and the catch 204, useable in conjunction with various escutcheons and/or trim plate adapters 300, 350, 400 as described herein. FIG. 8*a* illustrates a first embodiment of the snap fit joint 600 including a cantilever 602 on the trim plate adapter 300 and a receiver portion 606 on the trim plate 114, and a post 604. The cantilever 602 includes a protrusion 608 configured to engage the receiver portion 606 and maintains the chassis 200 secured to the respective trim plate adapter.

FIG. 8*b* illustrates an alternative embodiment of a snap fit joint 600 including a cantilever 602 of the trim plate adapter 300 and a receiver portion 606 of the trim plate 114. The receiver portion 606 includes a first and second protrusion 608*a*, 608*b* configured to engage the cantilever 602 and maintains the chassis 200 secured to the respective trim plate adapter.

FIG. 8*c* illustrates yet another embodiment of a snap fit joint 600 including a cantilever 602 of the trim plate adapter 300 and a receiver portion 606 of the trim plate 114. The receiver portion 606 has a U-shape and includes a first protrusion 608*a* and a second protrusion 308*b* configured to engage the cantilever 602 and maintains the chassis 200 secured to the respective trim plate adapter.

Figure 9:
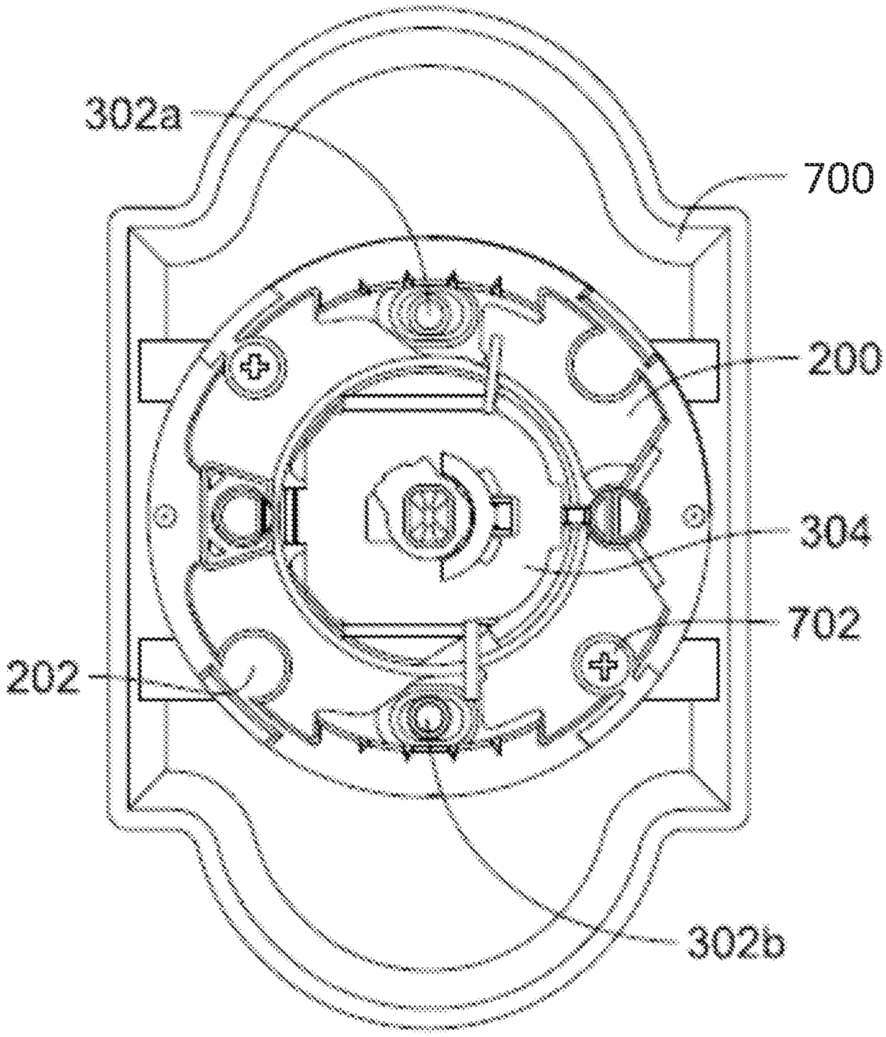
FIG. 9 illustrates an example embodiment of a cast escutcheon.

FIG. 9 illustrates an example of a chassis assembly including a cast escutcheon 700 connected to a chassis 200. The cast escutcheon 700 is configured to engage with the trim plate 114 to provide a secure fit. The cast escutcheon 700 is shown as having a decorative shape, but other alternative shapes are possible, such as rectangular, oval, or circular.

The escutcheon 700 includes first and second fastener holes 302*a*, 302*b*, a handle opening 304, and at least one post 702. In the embodiment shown, the escutcheon 700 includes four posts 702, two of the posts 702 extend through a fastener attachment 202 in the chassis 200 and two of the posts 702 extend into a fastener attachment 202 of the chassis 200. However, in other embodiments, the configuration of the posts 702 may be different.

In this example embodiment, the cast escutcheon 700 is directly mounted to the trim plate without use of a trim plate adapter. However, in alternative arrangements, a trim plate adapter could be used. The shape of the trim plate adapter, as noted above, could accommodate a shape of the escutcheon.

Figure 10:
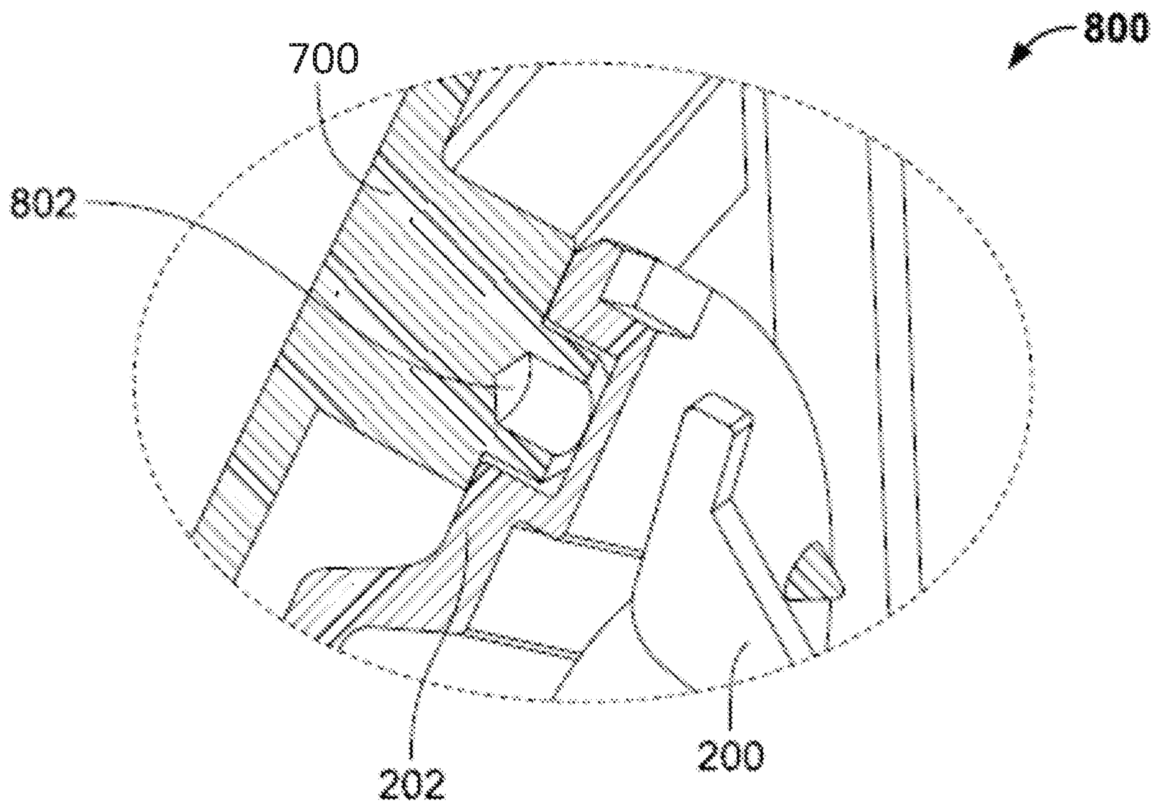
FIG. 10 illustrates an example engagement mechanism between a trim plate and an escutcheon.

FIG. 10 illustrates an embodiment of the connection 800 between a locating post 802 of the escutcheon 700 and the fastener attachment 202 of the trim plate 114. The escutcheon 700 includes a locating post 802 that not only engages the fastener attachment 202 of the trim plate 114, but is located under a blind hole to provide security, for example, when the escutcheon 700 is located on an exterior door. Further, the locating post 802 is configured to engage a fastener attachment 202 of the trim plate 114 to securely engage the chassis 200.

The connection between the escutcheon (e.g., escutcheons 104, 700) and/or trim plate adapter (e.g., adapters 300, 350, 400) and the trim plate 114 are removable connections, so the trim plate 114 is capable of connecting to a plurality of different escutcheons and/or trim plate adapters. Further, a new and/or different escutcheon and/or trim plate adapter may be removably connected to the trim plate 114 while the chassis 200 remains installed in a door.

Figure 11A:
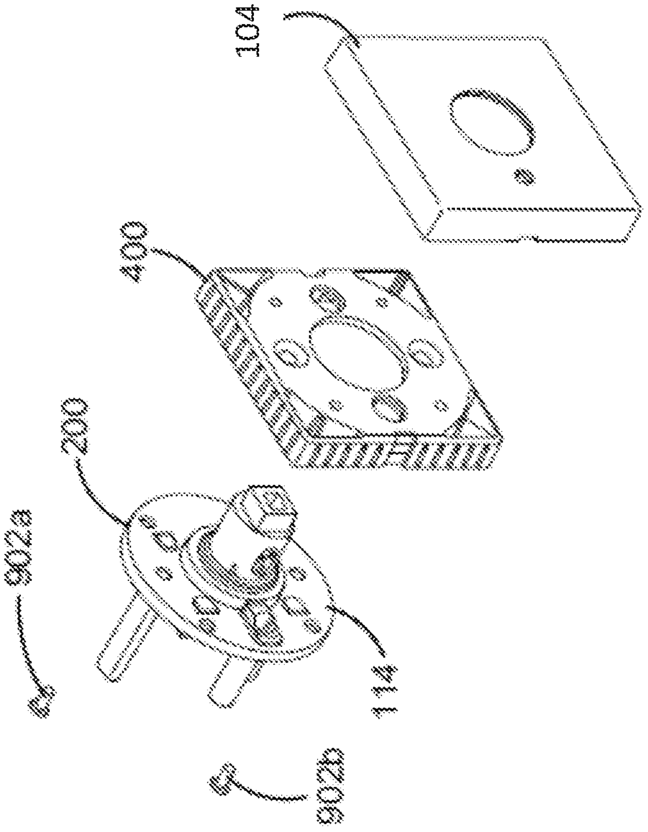
FIGS. 11*a*-11*b* illustrates an example chassis capable of engaging two different escutcheons.
Figure 11B:
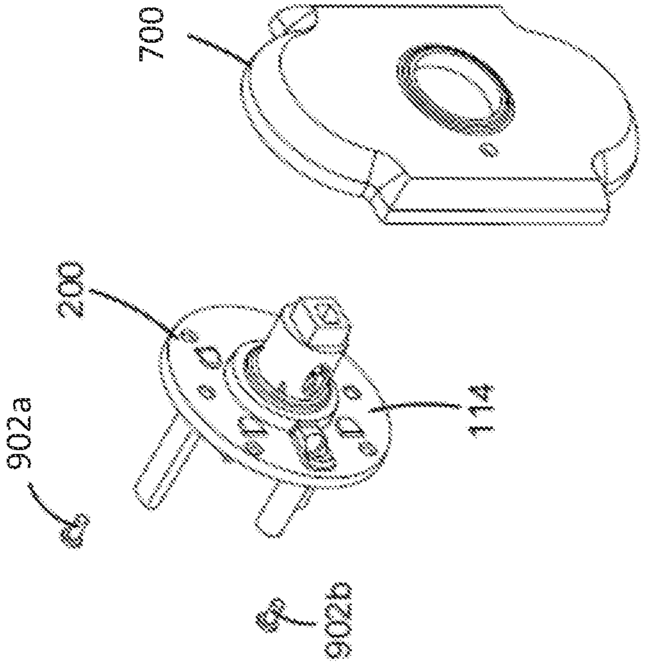

FIGS. 11*a* and 11*b* illustrate an example embodiment of a chassis 200 capable of connecting different escutcheons 104, 700. FIG. 11*a* illustrates the trim plate 114 capable of connecting to a trim plate adapter 400 and a first escutcheon 104, and FIG. 11*b* illustrates the same trim plate 114 capable of connecting to a second escutcheon 700. As shown, the second escutcheon 700 is different than the first escutcheon 104.

In an embodiment, the trim plate adapter 400 is connected to the escutcheon 104 via a friction fit and the trim plate adapter 400 is connected to the trim plate 114 of the chassis 200 via first and second fasteners 902*a*, 902*b*. Subsequently, when a second escutcheon 700 is to be connected to the chassis 200, the first and second fasteners 902*a*, 902*b* are disconnected and the trim plate adapter 400 and first escutcheon 104 are removed. Then, a second escutcheon 700 is connected to the trim plate 114 of the chassis 200 via the first and second fasteners 902*a*, 902*b*.

An example method of installing a door handle assembly in a door as described herein includes the following. The door includes a bore formed through the door from an exterior side to an interior side. The door also includes a latch bolt bore formed from an edge of the door to the bore.

A first escutcheon (e.g., escutcheon 104) is attached to a trim plate 114 of an interior chassis portion 200*a*, and then the interior chassis portion 200*a* is inserted into the bore on the interior side of the door. A second escutcheon (e.g., escutcheon 104) is attached to a trim plate 114 of an exterior chassis portion 200*b*, and then the exterior chassis portion 200*b* is inserted into the bore on the exterior side of the door. The latch assembly is inserted into the latch bolt bore of the door. The interior chassis portion 200*a* is connected to the latch assembly 102 and the exterior chassis portion 200*b*, which forms the universal chassis 200.

The first escutcheon 104 may be attached to the trim plate 114 with or without a trim plate adapter, such as the trim plate adapters 300, 350 400.

After the chassis 200 is installed, a first handle 106*a* is connected to the interior chassis portion 200*a* and a second handle 106*b* is connected to the exterior chassis portion 200*b*. Before an escutcheon is removed, the handle 106 must also be removed.

When a new escutcheon is desired, the chassis 200 is removed from the door. Then, a new escutcheon (with a trim plate adapter, if needed) is attached to one of the trim plates 114. When changing the escutcheon, the chassis 200 does not also need to be changed. Further, if the trim plate 114 is first engageable with an escutcheon, the trim plate 114 is subsequently engageable with a trim plate adapter.

Referring to FIGS. 1-11 generally, it is noted that the door handle assembly described herein has a number of advantages in terms of ease of assembly and accommodation of various escutcheons. In particular, the universal chassis allows for the installation of any escutcheon, therefore eliminating the requirement that a chassis is only able to accommodate a predetermined escutcheon. Further, a trim plate adapter allows any escutcheon to be secured to the universal chassis. Additional advantages are apparent by way of the description of the door handle assembly provided herein, and as reflected in the claims included below.

The description and illustration of one or more embodiments provided in this application are not intended to limit or restrict the scope of the invention as claimed in any way. The embodiments, examples, and details provided in this application are considered sufficient to convey possession and enable others to make and use the best mode of the claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A door handle assembly comprising:

a chassis configured to be mounted on a door, the chassis including:

a first chassis portion including a first trim plate, a first handle mount, and at least one mounting post, the first handle mount and the at least one mounting post extending in opposite directions from the first trim plate, the first trim plate configured to extend from a first side of the door; and a second chassis portion including a second trim plate defining at least one fastener hole and a second handle mount extending from the second trim plate, the second trim plate configured to extend from an opposite second side of the door, wherein the first chassis portion is configured to couple to the second chassis portion with at least one fastener that extends through the at least one fastener hole and into the at least one mounting post with a latch mount extending between the first and second handle mounts; and a latch assembly configured to be mounted on the door disposed between the first chassis portion and the second chassis portion and operatively coupled to the latch mount, wherein one or both of the first trim plate and the second trim plate have a base defining at least one outside facing coupling; and an outer body defining a handle opening and at least one interior facing coupling, wherein the outer body is configured to couple to the base with the at least one outside facing coupling engaging with the at least one interior facing coupling such that the handle opening is aligned with the first or second handle mount and a handle can extend therethrough.

2. The door handle assembly of claim 1, wherein the outer body is an escutcheon that couples directly to the base.

3. The door handle assembly of claim 1, wherein the outer body is an adapter that couples directly to the base, the adapter also configured to removably couple to an escutcheon.

4. The door handle assembly of claim 3, further comprising the escutcheon, wherein the adapter has an outer perimeter configured to fit within the escutcheon, the escutcheon configured to attach to the outer perimeter of the adapter.

5. The door handle assembly of claim 3, wherein the adapter includes at least one second fastener hole.

6. The door handle assembly of claim 1, wherein the at least one outside facing coupling is a recess/aperture or a post and the at least one interior facing coupling is the other of the recess/aperture or the post.

7. The door handle assembly of claim 6, wherein the at least one outside facing coupling is an aperture such that at least one second fastener is configured to secure the trim plate to the outer body via the aperture.

8. The door handle assembly of claim 1, wherein the at least one outside facing coupling is a cantilever or a receiver portion and the at least one interior facing coupling is the other of the cantilever or the receiver portion.

9. The door handle assembly of claim 8, wherein the cantilever and the receiver portion form a snap-fit connection.

10. The door handle assembly of claim 8, wherein the at least one outside facing coupling also includes a recess or a post and the at least one interior facing coupling also includes the other of the recess or the post.

11. The door handle assembly of claim 10, further comprising at least one second fastener configured to secure the trim plate to the outer body.

12. A door handle assembly comprising:

a chassis configured to be mounted on a door, the chassis including:

a first chassis portion including a first trim plate and a first handle mount extending from the first trim plate, the first trim plate configured to extend from a first side of the door and having a first base defining at least one first outside facing coupling; and a second chassis portion including a second trim plate and a second handle mount, extending from the second trim plate, the second trim plate configured to extend from an opposite second side of the door and having a second base defining at least one second outside facing coupling, wherein the first chassis portion is configured to couple to the second chassis portion with a latch mount extending between the first and second handle mounts; and a latch assembly configured to be mounted on the door disposed between the first chassis portion and the second chassis portion and operatively coupled to the latch mount;

a first escutcheon or a first adapter defining a first handle opening and at least one first interior facing coupling, wherein the at least one first interior facing coupling is configured to engage with the at least one first outside facing coupling such that the first handle opening is aligned with the first handle mount;

a first handle mounted on the first handle mount and extending through the first handle opening;

a second escutcheon or a second adapter defining a second handle opening and at least one second interior facing coupling, wherein the at least one second interior facing coupling is configured to engage with the at least one second outside facing coupling such that the second handle opening is aligned with the second handle mount; and a second handle mounted on the second handle mount and extending through the second handle opening.

13. The door handle assembly of claim 12, further comprising the first escutcheon and the first adapter, the first escutcheon removably coupled to the first adapter and the first adapter couples to the first chassis portion.

14. The door handle assembly of claim 12, further comprising the second escutcheon and the second adapter, the second escutcheon removably coupled to the second adapter and the second adapter couples to the second chassis portion.

15. The door handle assembly of claim 12, wherein the at least one first and second outside facing couplings include a recess or aperture and the at least one first and second interior facing couplings include a corresponding post.

16. The door handle assembly of claim 15, further comprising at least one second fastener configured to engage the trim plate to the escutcheon or adapter.

17. The door handle assembly of claim 12, wherein the at least one first and second outside facing couplings include a receiver portion and the at least one first and second interior facing couplings include a corresponding cantilever.

18. The door handle assembly of claim 12, wherein the at least one first and second outside facing couplings include a recess or aperture and a receiver portion, and the at least one first and second interior facing couplings include a corresponding post and cantilever.

19. A door handle assembly comprising:

a chassis configured to be mounted on a door, the chassis including:

a first chassis portion including a first trim plate and a first handle mount extending from the first trim plate, the first trim plate configured to extend from a first side of the door and having a first base defining a plurality of first apertures; and a second chassis portion including a second trim plate and a second handle mount, extending from the second trim plate, the second trim plate configured to extend from an opposite second side of the door and having a second base defining a plurality of second apertures, wherein the first chassis portion is configured to couple to the second chassis portion with a latch mount extending between the first and second handle mounts; and a latch assembly configured to be mounted on the door disposed between the first chassis portion and the second chassis portion and operatively coupled to the latch mount;

a first escutcheon or a first adapter including at least one first post and at least one first fastener mount, wherein the at least one first post engages with at least one of the plurality of first apertures, and wherein at least one first fastener extends through at least one of the plurality of first apertures and fastens to the at least one first fastener mount; and a second escutcheon or a second adapter including at least one second post and at least one second fastener mount, wherein the at least one second post engages with at least one of the plurality of second apertures, and wherein at least one second fastener extends through at least one of the plurality of second apertures and fastens to the at least one second fastener mount.

20. The door handle assembly of claim 19, further comprising both the first escutcheon and the first adapter, the first escutcheon configured to be mounted to the first adapter, and both the second escutcheon and the second adapter, the second escutcheon configured to be mounted to the second adapter.

* * * * *